United States Patent [19]

Bailey

[11] Patent Number: 4,960,211
[45] Date of Patent: Oct. 2, 1990

[54] VARIABLE RACK FOR RISING BREAD DOUGH

[76] Inventor: Almonte F. Bailey, 3115 Loma Verde Dr. #34, San Jose, Calif. 95117

[21] Appl. No.: 384,567

[22] Filed: Jul. 24, 1989

[51] Int. Cl.$^5$ .............................................. A47F 5/00
[52] U.S. Cl. ................................... 211/60.1; 211/13; 211/189; 99/441
[58] Field of Search ................ 211/13, 60.1, 189, 127; 99/441, 448, 450

[56] References Cited

U.S. PATENT DOCUMENTS

| | | | |
|---|---|---|---|
| 1,973,817 | 9/1934 | Lang | 99/441 X |
| 3,517,606 | 6/1970 | Myles et al. | 211/181 X |
| 4,527,694 | 7/1985 | Bolt et al. | 211/45 X |

FOREIGN PATENT DOCUMENTS 226488 10/1975 France .................................. 99/441

Primary Examiner—Robert W. Gibson, Jr.
Attorney, Agent, or Firm—William E. Hein

[57] ABSTRACT

A variable rack for rising bread dough can be quickly and easily configured to cradle one or more bread doughs of the same or different sizes during rising and the risen bread doughs can be simultaneously removed from the variable rack to a baking sheet, in the preferred position of soft dough side up, for direct transfer into the oven. The variable rack supports a series of adjustable canvas loops that cradle rising yeast bread doughs to produce European style loaves of bread that stand free on a baking sheet in the oven, as opposed to being confined in a baking pan.

3 Claims, 2 Drawing Sheets

VARIABLE RACK FOR RISING BREAD DOUGH

This invention relates generally to bread baking and more specifically to holders in which shaped bread doughs are permitted to finally rise. A fine loaf of French or Italian bread with its thick rugged crust has a special quality of goodness. It has body, chewability and a taste of grain many believe make it the world's best bread. These breads are made with simple ingredients of flour, salt, yeast, and water in a process that is not rushed. The baker lets the dough rise slowly and then deflates it from one to three times. For the final rise, the dough is shaped and conventionally placed in a banneton, a wicker or plastic basket lined with canvas, such as that described by Child and Beck, *Mastering the Art of French Cooking,* Vol. 2, p. 64–66, 71 (Alfred A. Knopf, 1970). The shape of these prior art bannetons determines the shape of the loaf of bread. When the dough has risen, the basket is inverted and the loaf is deposited onto a long handled wooden paddle termed a pelle. The dough is then slid off onto a baking sheet or the oven floor to bake. Two conditions have occurred during this final rise. The expanding dough has been forced upward by the sides of the basket, and the surface of the dough that has been exposed to air has developed a crust. Since the banneton and dough are inverted when the dough is removed prior to baking, this crusted portion of the dough becomes the bottom of the loaf. The soft, tender dough cradled in the canvas of the banneton during rising becomes the top of the loaf. When the dough is then subjected to the heat of the oven, the soft, tender dough that has become the top of the loaf rises to a greater volume than would the crusted dough.

An amateur baker attempting to duplicate the French or Italian bread loaf at home can purchase various size baskets and line them with canvas to provide a number of bannetons, or a sheet of canvas may be used to make a "couche". See Clayton, *New Complete Book of Breads,* p. 24 (Simon & Schuster, 1987). When employing a couche, one shaped dough is placed on the canvas from which the couche is formed, and a ridge is pinched in the canvas to hold that dough in place. Then, another shaped dough is placed next to that ridge and another ridge is pinched in the canvas to hold that dough, etc. The ends of the canvas are held in place by strips of wood to act like bookends to force the dough up, not out. After the doughs have risen, a cardboard or plywood board sprinkled with cornmeal is placed next to a dough at one end of the canvas. The canvas is pulled to raise and then flop each dough, in sequence, upside down on the board. Each risen dough is then slid off the board onto a baking sheet. These prior art couches are disadvantageous in that they do not hold the rising doughs very securely or uniformly. In addition, it is difficult and time consuming to separately transfer all of the doughs held by the couche onto the baking sheet.

A prior art pan stamped out of metal to form U-shaped troughs is widely used by home bakers to make French and Italian bread loaves. These pans are commonly available in two sizes. One size is used for baking a long narrow baguette, and another size is employed to bake a wider long loaf about five inches by sixteen inches in size. The dough is permitted to rise in such a pan and is then baked in the same pan. Loaves of bread produced in these prior art metal pans don't have the full volume produced by loaves allowed to rise in a banneton since the surface of the dough is exposed to air and develops a crust during rising that inhibits further expansion during baking.

It is therefore a principal object of the present invention to provide a variable rack for rising bread dough that can be quickly and easily configured to cradle one or more bread doughs of the same or different sizes during rising and from which all of the bread doughs so cradled can be simultaneously transferred to a baking sheet for baking. This and other objects are accomplished in accordance with the illustrated preferred embodiment of the present invention by providing a rack that may be assembled and disassembled, as desired, the rack supporting a series of adjustable canvas loops that cradle rising yeast bread doughs to produce European style loaves of bread that subsequently stand free on a baking sheet in an oven, as opposed to being confined in a baking pan.

DESCRIPTION OF THE PREFERRED EMBODIMENT

Figure 1:
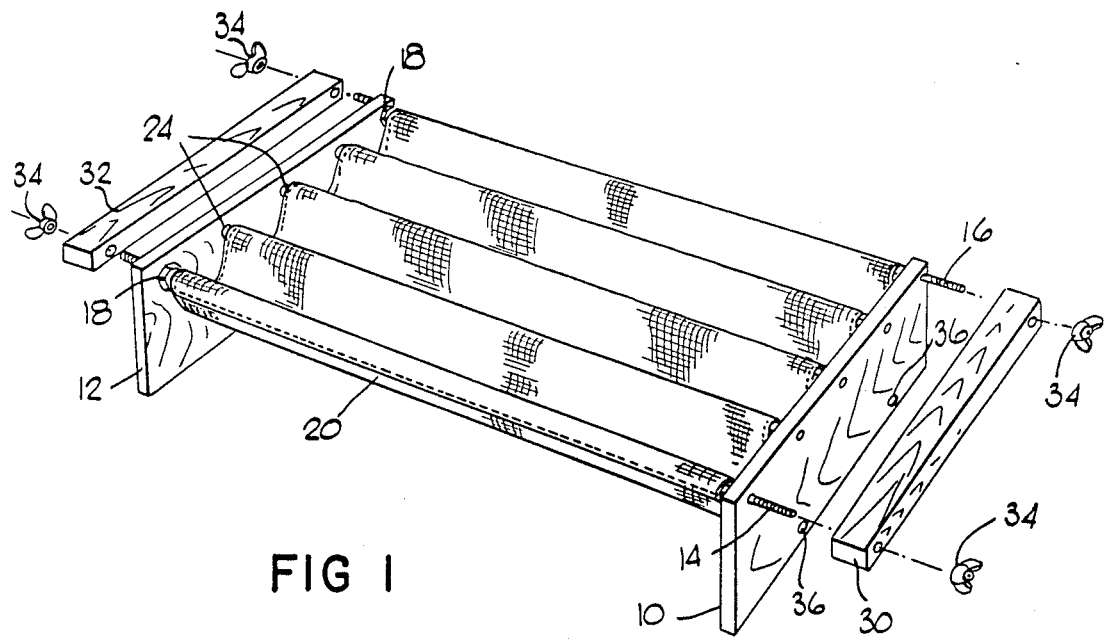
FIG. 1 is a pictorial illustration of a variable rack for rising bread dough constructed in accordance with the present invention, the illustrated configuration being adapted to accept four baguette style bread doughs for rising.

Referring now to the pictorial illustration of FIG. 1, there is shown a variable rack for rising bread doughs that includes a pair of end supports 10 and 12 that are secured in spaced apart, parallel relationship to each other by a pair of rods 14 and 16 that are threaded on each end and are adapted to pass through holes located near the top of each of end supports 10 and 12. Hex nuts 18 on the threaded portions of rods 14 and 16 serve as stops for end supports 10 and 12. A canvas 20 is supported between rods 14 and 16 by means of channels 21 created by sewn folds on the bottom surface of canvas 20 at each end thereof, through which rods 14 and 16 pass. Additional equidistantly spaced sewn channels 22 are provided on the bottom surface of canvas 20, as shown in detail in FIG. 4. Channels 22 may be conveniently created using 1-inch wide bias tape. Intermediate smooth rods 24, 26, 28 are passed through sewn channels 22 on the bottom surface of canvas 20 and terminate in corresponding equidistantly spaced holes in end supports 10 and 12 that are horizontally aligned with the two holes in end supports 10 and 12 through which rods 14 and 16 pass. A pair of handles 30 and 32 are appropriately drilled for acceptance by rods 14 and 16. Finally, a wing nut 34 is threaded onto each end of rods 14 and 16. Tightening wing nuts 34 acts to secure handles 30 and 32 against end supports 10 and 12 and to prevent movement of intermediate smooth rods 24, 26, 28. While any of a number of commercially available construction materials may be chosen for fabrication of end supports 10, 12, handles 30, 32, and rods 14, 16, 24, 26, 28, it has been found that wood is ideal for end supports 10, 12 and for handles 30, 32 and that aluminum or steel rod is well suited for fabricating rods 14, 16, 24, 26, 28.

Figure 4:
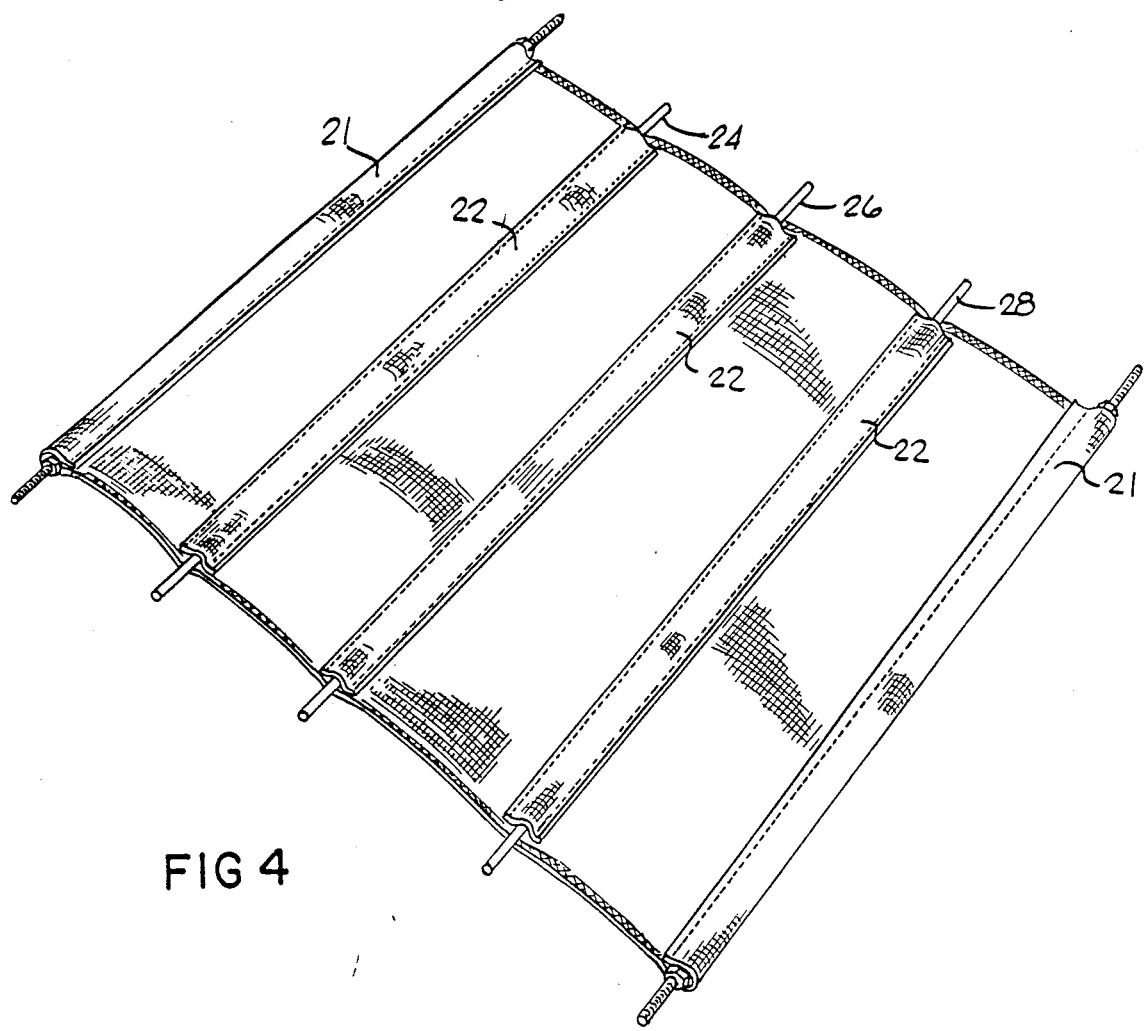
FIG. 4 is an illustration of the underside of the canvas employed in the variable rack for rising bread dough of FIGS. 1–3 showing the spaced apart rod channels and the rod placement required to obtain the configuration of FIG. 1 for accepting four baguette style bread doughs for rising.

The configuration illustrated in FIG. 1 in which the three intermediate smooth rods 24, 26, 28 are employed in combination with the two rods 14 and 16 to support the canvas 20 at the two channels 21 and the three channels 22 of FIG. 4 serves to create four cradles of equal width in canvas 20 for holding four bread doughs of baguette size for rising.

Figure 2:
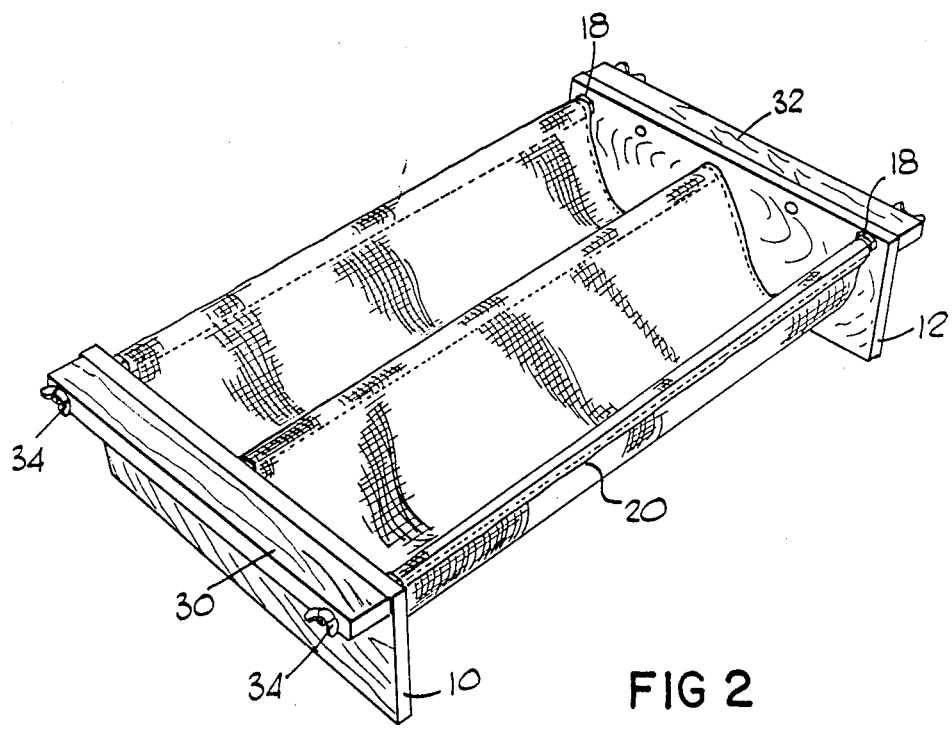
FIG. 2 is a pictorial illustration of a variable rack for rising bread doughs as in FIG. 1 configured to accept two wide bread doughs for rising.

As illustrated in FIG. 2, the variable rack for rising bread doughs may be configured to create two deeper and wider cradles in canvas 20 for holding two larger bread doughs for rising. This configuration is achieved by simply removing either of handles 30, 32 and by then removing intermediate smooth rods 24 and 28. The removed handle is then replaced.

Figure 3:
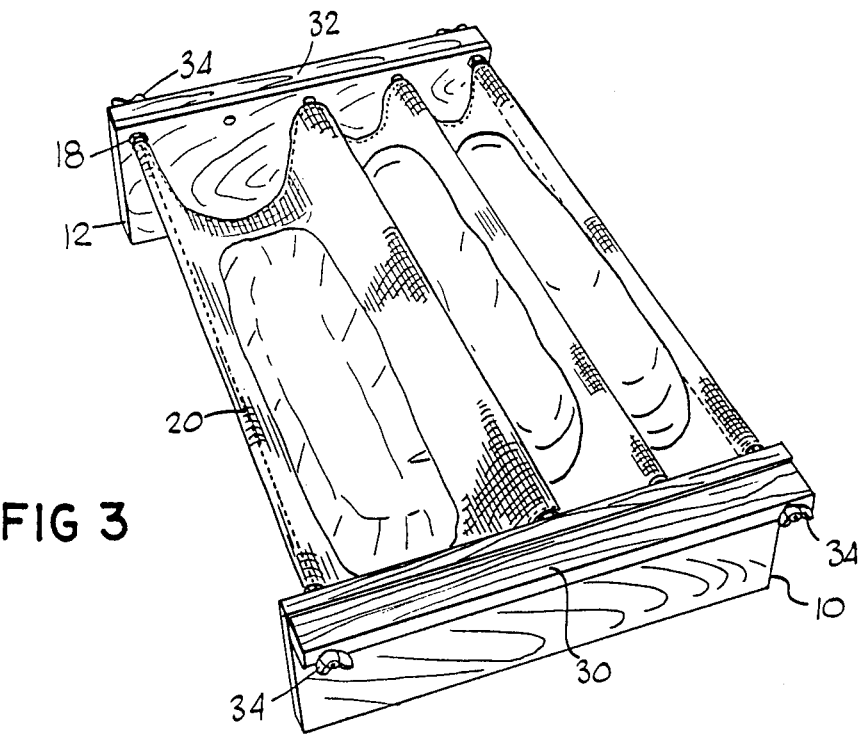
FIG. 3 is a pictorial illustration of a variable rack for rising bread doughs as in FIGS. 1 and 2 configured to accept one wide bread dough and two baguette style bread doughs for rising.

As shown in FIG. 3, the variable rack for rising bread doughs may be configured to create two baguette size cradles and one larger size cradle in canvas 20 by retaining intermediate smooth rods 26, 28 and removing rod 24.

One very large bread dough may be held in a single cradle configuration of the variable rack of the present invention by relocating rods 24 and 26 to a spaced apart pair of holes located near the bottom edge of the end supports 10 and 12. Threaded rod 14 is passed through the channel 22 adjacent one of the channels 21. The remaining channel 21 is unused in this configuration.

It will be appreciated that the variable rack for rising bread doughs described hereinabove may be expanded to include additional channels on the bottom surface of canvas 20 and corresponding additional intermediate smooth rods and holes in end supports 10 and 12 to create an expanded number of variable size cradles in canvas 20 for holding bread doughs for rising. All channels for rods 14, 16, 24, 26, 28 and for any additional intermediate rods that may be desired are preferably fabricated on the bottom surface of canvas 20 so that the top surface remains smooth for cradling the bread doughs. In order to create the various cradle configurations in canvas 20 described above, it has been found that a canvas having overall dimensions of 18" by 20½" works well. The five channels 21, 22 preferably fabricated equidistantly along the 18" dimension. Thus, in the configuration in which the variable rack is set to accommodate four baguette bread doughs, each risen dough may be approximately 2½" wide, 2" or more high, and up to 17" long. In the configuration in which the variable rack is set to accommodate two large bread doughs, each risen dough may be approximately 5" wide, 3½" or more high, and up to 17" long. In the configuration in which the variable rack is set to accommodate a single bread dough, the risen dough may be approximately 10½ wide, 5" or more high, and up to 17" long.

Regardless of the cradle configuration of the canvas 20 of the variable rack for rising bread doughs, the rises bread doughs may be simultaneously removed to a baking sheet by simply placing a baking sheet in an inverted position over the variable rack and by then simply simultaneously turning both the baking sheet and the variable rack. The bread doughs will then be in proper position on the baking sheet, soft dough side up, for direct transfer into the baking oven.

What is claimed:

1. A variable rack for rising bread doughs, the variable rack comprising:
   a pair of spaced apart parallel end supports;
   a pair of end support rods removably connected to said end supports for maintaining said end supports in a spaced apart parallel position;
   canvas means having a smooth upper surface and having a plurality of rod channels provided on a bottom surface thereof;
   a plurality of intermediate support rods removably connected between said pair of end supports and which, together with said pair of end support rods, are selectively arranged to support said canvas means between said pair of end supports by passing them through selected ones of said rod channels to provide a selected number and size of cradles in said canvas means, each of said cradles being operative for supporting a rising bread dough.

2. A variable rack for rising bread doughs as in claim 1, further comprising a pair of handles, each of which is connected to an outside surface of said pair of end supports by means of said pair of end support rods.

3. A variable rack for rising bread doughs as in claim 1 wherein each of said pair of end supports includes a plurality of spaced apart apertures for receiving said pair of end support rods and selected ones of said plurality of intermediate supports rods.

* * * * *